M. W. FAHERTY.
STEAM COOKER FOR OIL BEARING MEAL AND THE LIKE.
APPLICATION FILED MAY 2, 1908.
909,773.
Patented Jan. 12, 1909.
2 SHEETS—SHEET 2.
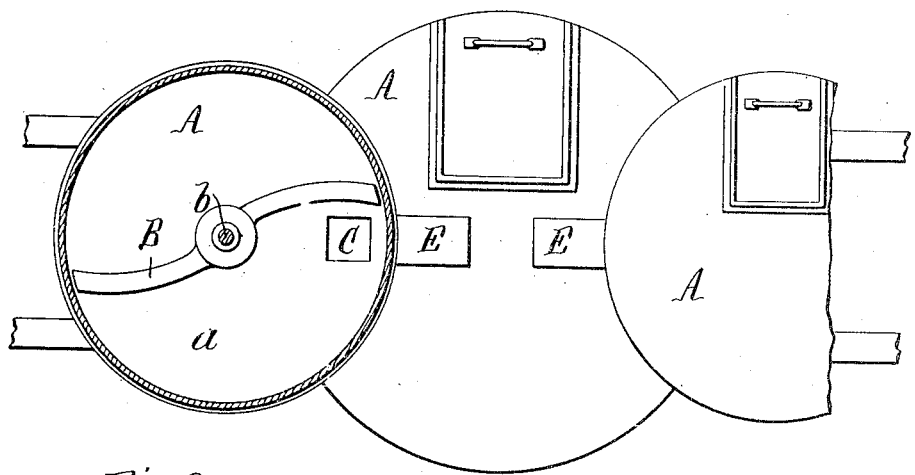
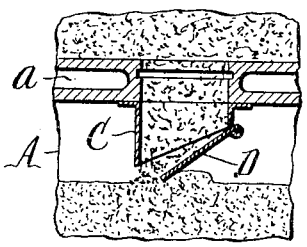
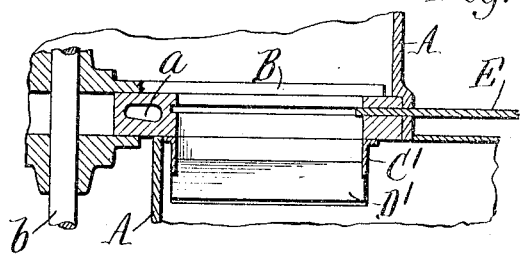
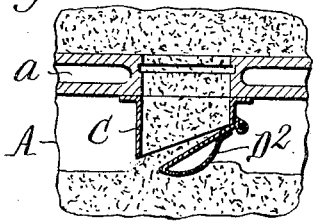
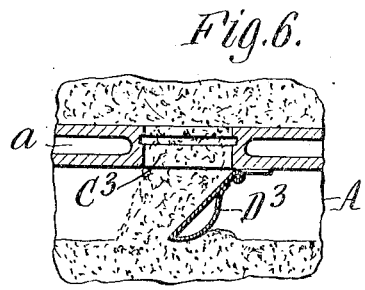
Witnesses:
E. A. Volk
C. S. Dimond.
Inventor
Michael W. Faherty
by Wilhelm, Parker & Hurd
Attorneys.

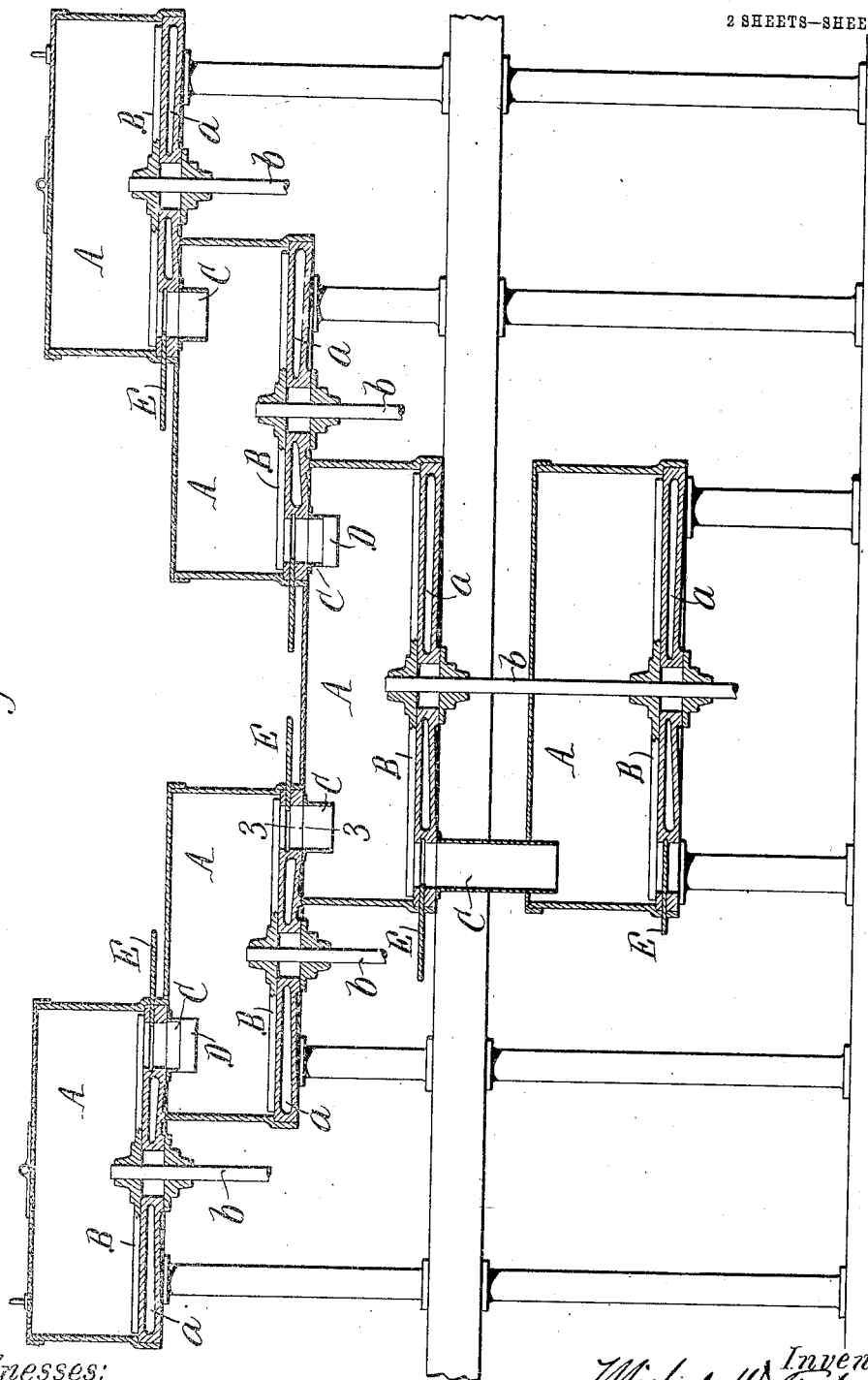

UNITED STATES PATENT OFFICE.

MICHAEL W. FAHERTY, OF MEMPHIS, TENNESSEE, ASSIGNOR TO ALFRED W. FRENCH, OF PIQUA, OHIO.

STEAM-COOKER FOR OIL-BEARING MEAL AND THE LIKE.

No. 909,773.  Specification of Letters Patent.  Patented Jan. 12, 1909.

Application filed May 2, 1908. Serial No. 430,526.

*To all whom it may concern:*

Be it known that I, MICHAEL W. FAHERTY, a citizen of the United States, residing at Memphis, in the county of Shelby and State of Tennessee, have invented a new and useful Improvement in Steam-Cookers for Oil-Bearing Meal and the Like, of which the following is a specification.

This invention relates more particularly to improvements in continuous automatic cookers of the kind disclosed in U. S. Letters Patent No. 852,058, granted to A. W. French April 30, 1907, which are used in oil mills for cooking the oil bearing meal preparatory to expressing the oil therefrom. In the said patented cooker a plurality of superimposed steam kettles are employed provided with bottom discharge openings so arranged that the meal discharges by gravity from each kettle to the one next below, and the delivery of meal to a kettle is controlled by the quantity of meal therein. When meal is withdrawn from the lowest kettle to form a cake for pressing, the level of the meal lowers in this kettle, which allows a corresponding amount of meal to discharge therein from the kettle next above and lower the level of meal in this second kettle, and in a similar manner the discharge of meal from each kettle causes a corresponding quantity of meal to be delivered thereto from the kettle next above. Meal is fed to the top kettle automatically by suitable means, and when all the kettles have once been filled the quantity of meal in each kettle is kept substantially constant by the stated operation of the cooker, and as the meal is delivered into the top and discharged from the bottom of each kettle and is not mixed but descends through the system in layers, a definite period of time, determined by the rate at which the meal is drawn from the bottom kettle, is required for any particular batch of meal to pass through the cooker, so that by drawing the meal from the bottom kettle at regular intervals, all of the meal is uniformly cooked and the services of a skilled meal cook are dispensed with.
The object of the present invention is to provide controlling valves, gates or devices for the discharge openings of the kettles which are positively operated by the meal accumulating in the kettles in such manner as to automatically control the passage of the meal through the cooker and govern the quantity of meal in the kettles to thereby insure a uniform and proper cooking of all of the meal without the services of a skilled meal cook.

In the accompanying drawings, consisting of two sheets: Figure 1 is a sectional elevation of a steam cooker embodying the invention. Fig. 2 is a fragmentary sectional plan thereof. Fig. 3 is a cross-section, on an enlarged scale, through the discharge spout of one of the kettles, in line 3—3, Fig. 1. Fig. 4 is a sectional elevation of a spout of modified construction. Figs. 5 and 6 are sections similar to Fig. 3 of two other modifications of the discharge spout and gate.

Like letters of reference refer to like parts in the several figures.

The cooking or heating kettles or vessels A are arranged in a descending series or one below the other so that the meal can discharge by gravity through an opening or spout at the bottom of one kettle into the kettle next below. In the construction shown in Fig. 1 of the drawings, the kettles A are arranged in two stepped flights converging to a single kettle which is common to both flights and is over another or subkettle, but this arrangement it not essential to the automatic action of the cooker and the kettles could be arranged in other ways so long as the meal can discharge from one to the other, for instance, as shown in said French patent, or one vertically over the other, as in the case of the two lowest kettles shown in the drawings hereof. Any suitable number of kettles may be employed, the cooker illustrated having six. The kettles can have hollow bottoms *a* forming steam chambers which are supplied with steam by the usual means (not shown) for cooking or heating the meal, or they can be of any other usual or suitable construction.

B represents the usual rotary stirrers or scrapers consisting of arms projecting horizontally in the lower portions of the kettles from central vertical shafts *b* which are driven by usual or suitable mechanism. The stirrers scrape the meal from the bottoms of the kettles and keep it in motion so as to prevent the meal from scorching and positively move it to the discharge openings.

Each kettle with the exception of the last or sub-kettle, in the constructions shown in

Figs. 1-3, has a discharge spout C which depends into the next lower kettle below the top thereof, and each discharge spout is provided with a controlling gate, valve or device D which is moved or shifted by the meal in the kettle in which it is located when the meal accumulates to a predetermined height in the kettle to stop or check the further delivery of meal to said kettle through the spout. One side of the spout is of less depth than the opposite side and the gate or valve consists of a plate hinged to and depending from the lower edge of the shallow side of the spout so as to be capable of swinging toward and from the opposite deep side of the spout to more or less close or contract the discharge opening of the spout. The stirrers rotating in the kettles cause the meal to move in the kettles in the same direction as the stirrers, and they also produce a wave-like motion in the meal in the same direction. The gate or valve is located at one or the other side of the spout, depending upon the direction of motion of the meal in the kettle in which the spout is located, as the gate or valve should be at that side of the spout which is first reached by the meal rotating in the kettle, so that when the meal accumulates high enough in the kettle it will engage the gate or valve and by its motion swing and hold the gate over more or less toward the opposite side of the spout, as shown in Fig. 3, thereby contracting the discharge opening of the spout more or less and checking or stopping the discharge of meal through the same. When, therefore, the meal in each kettle, except the first, accumulates to a predetermined height substantially at or somewhat above the lower end of the spout which discharges thereinto, the delivery of meal to the kettle will be stopped until enough meal is discharged from this kettle to lower its level and allow the gate or valve to swing open again and permit the delivery of meal thereto from the spout.

In the cooker shown in Figs. 1-3, the discharge spouts C are located near the sides of the kettles and are comparatively short in a direction radially of the kettle, but the discharge opening or spout can, if desired, be made longer, as shown at C', Fig. 4, to extend nearly to the center of the kettle so that the meal can discharge from the central as well as from the side portion of the kettle. In this construction the gate D' extends along one of the long sides of the spout. A long continuous opening or spout can be used, as shown, or a similar result can be secured by a plurality of small openings or spouts.

Fig. 5 shows a gate $D^2$ having a swell or curved back which has a tendency to ride on the surface of the meal and prevent the gate from swinging open after the passage of each wave of meal caused by the stirrers. The gate thus constructed is steadier in action than the simple flat gate.

The gates shown in Figs. 1-5 are all applied to spouts depending from the bottom of the kettles, but the swinging gate can also be used to control the discharge from an opening in the flat bottom of the kettle, as shown in Fig. 6, in which $C^3$ represents the opening and $D^3$ the gate. The meal can rise somewhat higher in the kettles when the depending discharge spouts are not used.

In the various constructions described a pivoted gate is employed which is acted upon directly by the meal, but it is not intended to limit the invention to this construction, as other sorts of gates, valves or devices actuated directly by the meal accumulating or moving in the kettles, or operated by the meal indirectly through mechanical instrumentalities, would operate in a similar manner to control the discharge from the discharge spouts or openings to maintain substantially constant quantities of meal in the kettles. The kettles are also preferably provided with the usual slide valves or gates E for closing the discharge openings when starting the cooker.

After all of the kettles are allowed to become once filled to the desired extent, the described means operate automatically in the manner stated to maintain a predetermined substantially constant quantity of meal in each kettle except the first and prevent the meal from completely filling the kettles.

I claim as my invention:

1. The combination of a plurality of heating kettles or chambers for solid material arranged in a descending series and each kettle except the last having a bottom discharge opening arranged to discharge into a lower kettle, and a device which is positively operated by the material accumulating in one kettle to control the delivery of material thereto from a higher kettle and regulate the quantity of material in the kettles, substantially as set forth.

2. The combination of a plurality of heating kettles or chambers for solid material arranged in a descending series and each kettle except the last having a bottom discharge opening arranged to discharge into a lower kettle, means which cause a motion of the material in the kettles, and a device which is moved by the moving material in one kettle when a predetermined quantity of material accumulates in said kettle to more or less stop the delivery of material thereto from the kettle which supplies the same, substantially as set forth.

3. The combination of a plurality of heating kettles or chambers for solid material arranged in a descending series and each kettle except the last having a bottom discharge opening arranged to discharge into a lower kettle, and a valve which is positively actuated by the material in one kettle when a predetermined quantity of material accumulates in said kettle to control the delivery of material thereto from the kettle which supplies the same, substantially as set forth.

4. The combination of a plurality of heating kettles or chambers for solid material arranged in a descending series and each kettle except the last having a bottom discharge opening arranged to discharge into a lower kettle, means which cause a motion of the material in the kettles, and a valve which is positively actuated by the motion of the material in one kettle when a predetermined quantity of material accumulates in said kettle to control the delivery of material thereto from the kettle which supplies the same, substantially as set forth.

5. The combination of a plurality of heating kettles or chambers for solid material arranged in a descending series and each kettle except the last having a discharge spout which depends into a lower kettle, and movable valves for controlling said discharge spouts, the valve for each spout being positively actuated by the material in the kettle in which it is located when a predetermined quantity of material accumulates in said kettle to control the delivery of material from said spout, substantially as set forth.

Witness my hand, this 28th day of April, 1908.

MICHAEL W. FAHERTY.

Witnesses:
CLARENCE CARTER,
J. H. JOHNSON.